United States Patent
Stoessel et al.

(10) Patent No.: US 7,824,777 B2
(45) Date of Patent: *Nov. 2, 2010

(54) ROBUST OPTICAL FILTER UTILIZING PAIRS OF DIELECTRIC AND METALLIC LAYERS

(75) Inventors: Chris H. Stoessel, Santa Rosa, CA (US); Andrew Wahl, Grossroehrsdorf (DE); Roland Thielsch, Dresden (DE); Matthew Coda, Menlo Park, CA (US); Julius Kozak, Antioch, CA (US); Richard T. Wipfler, Menlo Park, CA (US); Lee Boman, Belmont, CA (US)

(73) Assignee: Southwall Technologies, Inc., Palo Alto, CA (US)

( * ) Notice: Subject to any disclaimer, the term of this patent is extended or adjusted under 35 U.S.C. 154(b) by 322 days.

This patent is subject to a terminal disclaimer.

(21) Appl. No.: 12/079,360

(22) Filed: Mar. 26, 2008

(65) Prior Publication Data
US 2009/0246552 A1  Oct. 1, 2009

(51) Int. Cl.
 B32B 9/00 (2006.01)
 B05D 7/00 (2006.01)
 G02B 1/00 (2006.01)

(52) U.S. Cl. ........... 428/689; 428/639; 428/672; 428/673; 428/697; 428/699; 428/701; 428/702; 427/164; 427/419.2; 427/419.3; 359/588

(58) Field of Classification Search .............. None
See application file for complete search history.

(56) References Cited

U.S. PATENT DOCUMENTS

| | | | |
|---|---|---|---|
| 4,902,580 A | 2/1990 | Gillery | |
| 5,821,001 A | 10/1998 | Arbab et al. | |
| 6,034,813 A | 3/2000 | Woodard et al. | |
| 6,531,230 B1 | 3/2003 | Weber et al. | |
| 6,562,490 B2 | 5/2003 | Ebisawa et al. | |
| 6,579,423 B2 | 6/2003 | Anzaki et al. | |
| 6,699,585 B2 * | 3/2004 | Ebisawa et al. | 428/432 |
| 6,833,194 B1 | 12/2004 | O'Shaughnessy | |
| 6,965,191 B2 | 11/2005 | Koike et al. | |
| 2007/0242359 A1 | 10/2007 | Thielsch et al. | |
| 2007/0279748 A1 | 12/2007 | Barth et al. | |

* cited by examiner

*Primary Examiner*—Ling Xu
(74) *Attorney, Agent, or Firm*—Schneck & Schneck

(57) ABSTRACT

"Corrosion" performance of an optical filter is enhanced when a relatively thick zinc-based film functions as a seed layer for a subsequently formed silver-based film. At least two pairs of dielectric and metallic layers are included within the optical filter, where the zinc-based film is a second film of the dielectric layer and where the silver-based film is the metallic layer. The zinc-based film has a zinc content of at least 80 percent and has a thickness of at least 15 nm. In order to further improve the corrosion performance, gold may be incorporated into the silver-based film.

17 Claims, 3 Drawing Sheets

ROBUST OPTICAL FILTER UTILIZING PAIRS OF DIELECTRIC AND METALLIC LAYERS

TECHNICAL FIELD

The invention relates generally to providing an optical arrangement and more particularly to providing a cost-effective optical filter having target optical properties and a high resistance to deterioration.

BACKGROUND ART

The use of films to control the levels of reflection and transmission of a window at different frequency ranges of light is well known in the art. For vehicle windows and many windows of buildings and residences, glare is reduced by controlling transmissivity and reflectivity within the visible light range of wavelengths (400 nm to 700 nm). For the same window applications, heat load may be reduced by partially blocking solar transmission in either or both of the visible portion of the solar spectrum or the near infrared portion (700 nm to 1200 nm).

One known sequence of films for providing solar control is described in U.S. Pat. No. 6,034,813 to Woodard et al., which is assigned to the assignee of the present invention. The solar control arrangement includes a Fabry-Perot interference filter and a gray metal layer on a flexible polyethylene terephthalate (PET) substrate that may be subsequently attached to a window using an adhesive. The Fabry-Perot interference filter provides solar heat load reduction by preferentially passing light at certain wavelengths and reflecting light at other wavelengths.

In addition to the optical considerations relevant to providing solar control through a window, structural considerations must be addressed. Regarding structural stability, reducing the susceptibility of the optical arrangement to cracking during fabrication, installation or long-term use is an important goal. Reducing other forms of "corrosion" is at least as significant. Hardcoat layers are often added to provide protection, as is described in the above-referenced Woodard et al. patent. However, a hardcoat layer does not protect against corrosion that occurs during the fabrication process and has limited effectiveness against corrosion that is induced from the edges of the optical arrangement.

SUMMARY OF THE INVENTION

An enhanced "corrosion performance" of an optical filter is achieved by providing a relatively thick zinc-based film as a seed film for a subsequently formed silver-based film, where the zinc-based film is the second film of a two-film dielectric layer and where the silver-based film is a metallic layer. The resulting optical filter includes at least two of these pairs of dielectric and metallic layers. The relatively thick zinc-based film has a zinc content of at least 80 percent and has a thickness of at least 15 nm. The preferred embodiment is one in which the silver-based film includes gold, so as to provide further corrosion resistance.

In one embodiment, the thicknesses of the zinc-based films of the different pairs are non-uniform. The preferred embodiment with respect to this non-uniformity is to form a thinner zinc-based film for the pair adjacent to the substrate on which the optical filter is formed. For example, in an optical filter having three pairs of dielectric and metallic layers, the first zinc-based film may have a thickness of 15 nm, while each subsequently formed zinc-based films may have a thickness of 30 nm (with a maximum of 40 nm). The function of the zinc-based film is to promote growth of the silver-based film. If the zinc-based film has a sufficiently high content of zinc, the film functions as a seed layer for the subsequently formed metallic layer. However, it has been determined that while this function is important at the layer pair closest to the substrate, the importance is greater for the more distant pairs of dielectric and metallic layers. The zinc-based film has a zinc content of at least 50 percent and is preferably greater than 80 percent. In the most preferred embodiment, the zinc content is approximately 90 percent. Similarly, while the minimum thickness of the zinc-based layer is identified as being 15 nm, the minimum is preferably 20 nm and in the most preferred embodiment is 25 nm.

The zinc-based films may be an oxide of zinc tin (ZnSn), but other materials may be selected. An alternative to zinc tin is zinc aluminum. The zinc-based film may be sputter deposited, but should allow oxidation so that the film is a dielectric. In some embodiments, the material is not consistent throughout the thickness of at least one of the zinc-based films. For example, a sputtered zinc-based film may initially be ZnSn, with a transition to ZnAl and a return to ZnSn. The zinc content (e.g., 90 percent) may remain constant during the transitions. This or an alternative material variation along the film thickness may be determined to provide additional corrosion performance advantages.

As previously noted, the metallic layer is a silver-based film that preferably includes gold in order to increase corrosion resistance. Just as the zinc-based films may have different thicknesses among the different layer pairs, the percentages of gold may be different for different layer pairs. For applications in which the deterioration (corrosion) of the optical filter is most likely to occur from the major surface that is parallel to the surface of the substrate, a greater percentage of gold is incorporated into the final silver-based film. On the other hand, there may be window applications in which the more significant concern is attack from edges and the most susceptible layer pair is the one closest to the substrate. In such applications, it is advantageous to include a greater percentage of gold within the silver-based film nearest to the substrate.

In the preferred embodiment, the transparent dielectric film is indium-based, such as an indium oxide ($InO_x$). This initial film of the dielectric layer provides protection for the previously formed layer, particularly where the underlying layer is one of the silver-based films. By forming the indium-based film with a flow of high content hydrogen, the underlying silver-based film is protected from oxidizing and the process is more stable. The film has an index of refraction within the range of 1.1 to 2.5, but preferably the refractive index is within the range 1.3 to 2.1. The preferred material is $In_2O_3$, but the transparent dielectric film may be based upon an alternative oxidized metal, such as tin, titanium, zirconium, tantalum, niobium or hafnium.

Still referring to the preferred embodiment, the optical filter is designed for use in a window application, such as the window of a vehicle, residence or building. The layer pairs are consecutively formed so as to provide a Fabry-Perot filter with an alternating pattern of dielectric and metallic layers.

DETAILED DESCRIPTION

Figure 1:
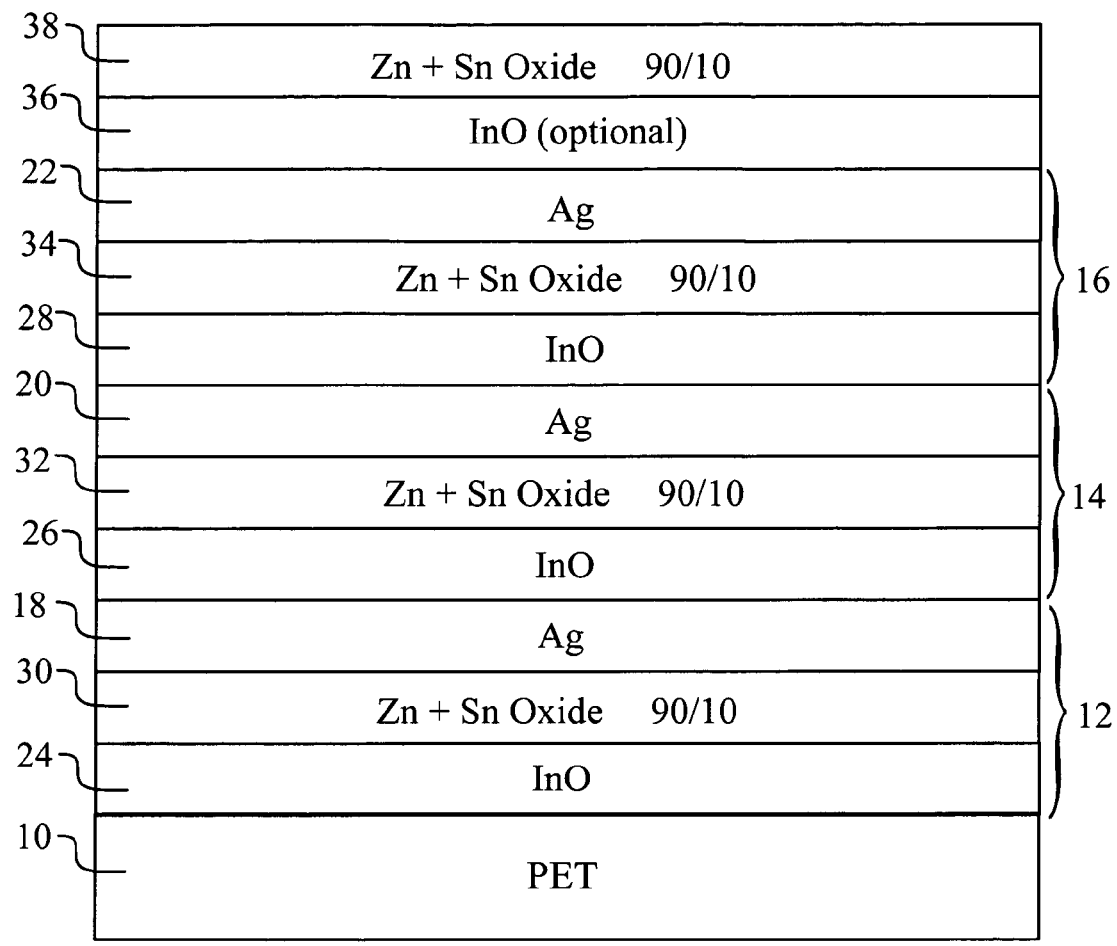
FIG. 1 is a side view of a layer stack on a substrate in accordance with the preferred embodiment of the invention.

With reference to FIG. 1, an alternating pattern of layers is formed on a flexible polymeric substrate 10. The polymeric substrate may be PET having a thickness of between 25 and 100 microns. While not shown in FIG. 1, the side of the substrate opposite to the layer stack may include a layer of adhesive and a release strip. The release strip is easily removed from the adhesive, allowing the adhesive layer to be used to couple the substrate to a member for which filtering is desired. For example, the filtering arrangement may be adhered to a window. In an alternative embodiment, the layer stack is formed directly on the member for which filtering is desired. In such applications, it may be necessary to pass a window panel through a sputter chamber for depositing the materials which form the layers.

FIG. 1 illustrates the preferred embodiment in which there are three layer pairs 12, 14 and 16 within the alternating pattern of dielectric and metallic layers. Each metallic layer 18, 20 and 22 is a single film of a silver or silver alloy. These metallic layers may be formed by first sputtering a silver-based film and then sputtering a thin titanium cap layer that is subsequently subjected to annealing and oxidation. It has been shown that by annealing the metal, the sheet resistance of the layer may be reduced to 0.8 ohms/square. Acceptable silver alloys include AgAu and AgPd. However, the preferred material is AgAu, since the gold content functions to retard various types of corrosion. The content of silver within the layer should be at least 50 percent, and preferably is at least 85 percent. Returning to the description of the preferred embodiment, the metallic layer is approximately 85 percent silver and approximately 15 percent gold.

Each dielectric layer is a two-film layer that comprises a transparent dielectric film 24, 26 and 28 with a zinc-based film 30, 32 and 34. The transparent dielectric film may be formed of an indium oxide. In FIG. 1, a fourth dielectric layer is shown as being formed by a fourth transparent dielectric film 36 and a fourth zinc-based film 38. In this embodiment, the three layer pairs with the alternating pattern may be considered as beginning with the first metallic layer (silver-based film 30), rather than the first dielectric layer.

The first film 24, 26 and 28 of each dielectric layer is preferably $InO_x$, and most preferably $In_2O_3$. By sputtering an indium-based film with a flow of high hydrogen content, the underlying material is protected against oxidation. This is particularly useful for the upper dielectric layers, since the underlying silver-based films 18, 20 and 22 are protected against oxidation. Moreover, the formation of an indium-based film is stable in sputter deposition. Nevertheless, it has been determined that benefits are also acquired if this first film of the dielectric layer is instead tin-based, titanium-based, zirconium-based, tantalum-based, niobium-based or hafnium-based.

The zinc-based films 30, 32 and 34 of the dielectric layers are used to promote growth of the silver-based films 18, 20 and 22. The thickness of each zinc-based film is at least 15 nm. The relatively thick zinc-based "seed" films improve "corrosion" performance of the final optical filter. The films are primarily zinc and are preferably at least 80 percent zinc, but must be oxidized in order to ensure that the film is a dielectric. FIG. 1 shows the most preferred embodiment in which the films comprise 90 percent zinc and 10 percent tin. However, as previously noted, one or more of the zinc-based films may be sputtered to include variations in material along its thickness (e.g., ZnSn to ZnAl, with a return to ZnSn). When sputtering techniques are used to provide the different films (as in the preferred embodiment), the percentage refers to the content of the sputtering targets, so that references to "percentages" do not relate to the oxidation.

There is a desirable lattice match between silver and a zinc oxide having a high percentage of zinc. Consequently, the zinc-based films 30, 32 and 34 promote nucleation and epitaxial growth for the silver-based films 18, 20 and 22. As the thickness of a sputtered zinc oxide is increased, the crystal grain size also increases. This may result in a zinc-based oxide film changing from an amorphous thin film to a significantly crystallized film, depending upon its thickness. As noted, the thickness of each zinc-based film 30, 32 and 34 is at least 15 nm (preferably at least 20 nm and most preferably 25 nm) and is less than the total thickness of the dielectric layer (since the dielectric layer also includes the transparent dielectric film 24, 26 and 28). The minimum thickness of 15 nm results in a more crystalline film and provides a better seed layer for the subsequently sputtered silver-based film, because the interface is "stronger" and is more resistant to separation and corrosion. Preferably, the thickness of a zinc-based film is less than 40 nm. In the most preferred embodiment, the thickness is greater than 25 nm, but no greater than 40 nm.

In some embodiments of the invention, the thicknesses of the zinc-based films 30, 32 and 34 are non-uniform. It has been determined that the thickness of the zinc-based film 30 adjacent to the substrate 10 plays a less significant role than the thicknesses of the films 32 and 34 that are further from the substrate. This is true of the fourth zinc-based film 38 as well. The thickness of the first zinc-based film 30 may be 25 nm, while the remaining films have a thickness of 30 nm.

Non-uniformity may also apply to the content of gold within the silver-based layers 18, 20 and 22. The gold content may be tailored on the basis of various considerations, primarily cost and corrosion resistance. In most applications, the integrity of the optical filter is attacked from above, as viewed in the orientation of FIG. 1. In such applications, the gold content of the top silver-based film 22 is greater than that of the lower films 18 and 20. This is the preferred embodiment for applications that include tailoring of gold content. However, there may be some applications in which the corrosion source of greatest concern is one that is experienced during the fabrication of the optical filter. If so, it may be beneficial to have a greater gold content for the first silver-based film 18 that is formed. This alternative embodiment may also be desirable for applications in which the corrosion source of greatest concern "attacks" from the edges of the optical filter.

Figure 2:
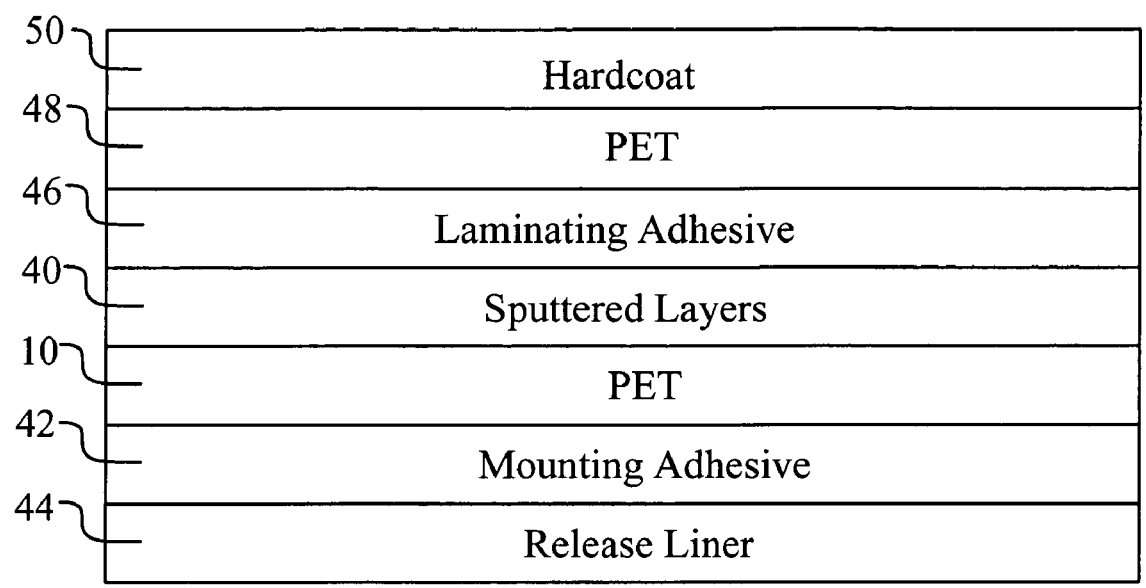
FIG. 2 is a side view of a filter arrangement in which the present invention is incorporated.

FIG. 2 shows a more complete assembly in which the invention is utilized. The layer stack 40 represents the sputtered layers on the substrate 10 of FIG. 1. A mount adhesive 42 is used to adhere the assembly to a window for which optical filtering is desired. A release liner 44 remains in position in contact with the mounting adhesive until the assembly is ready for attachment to the window. A laminating adhesive 46 secures a second PET substrate 48 having a hardcoat layer 50 to the other components of the assembly.

Figure 3:
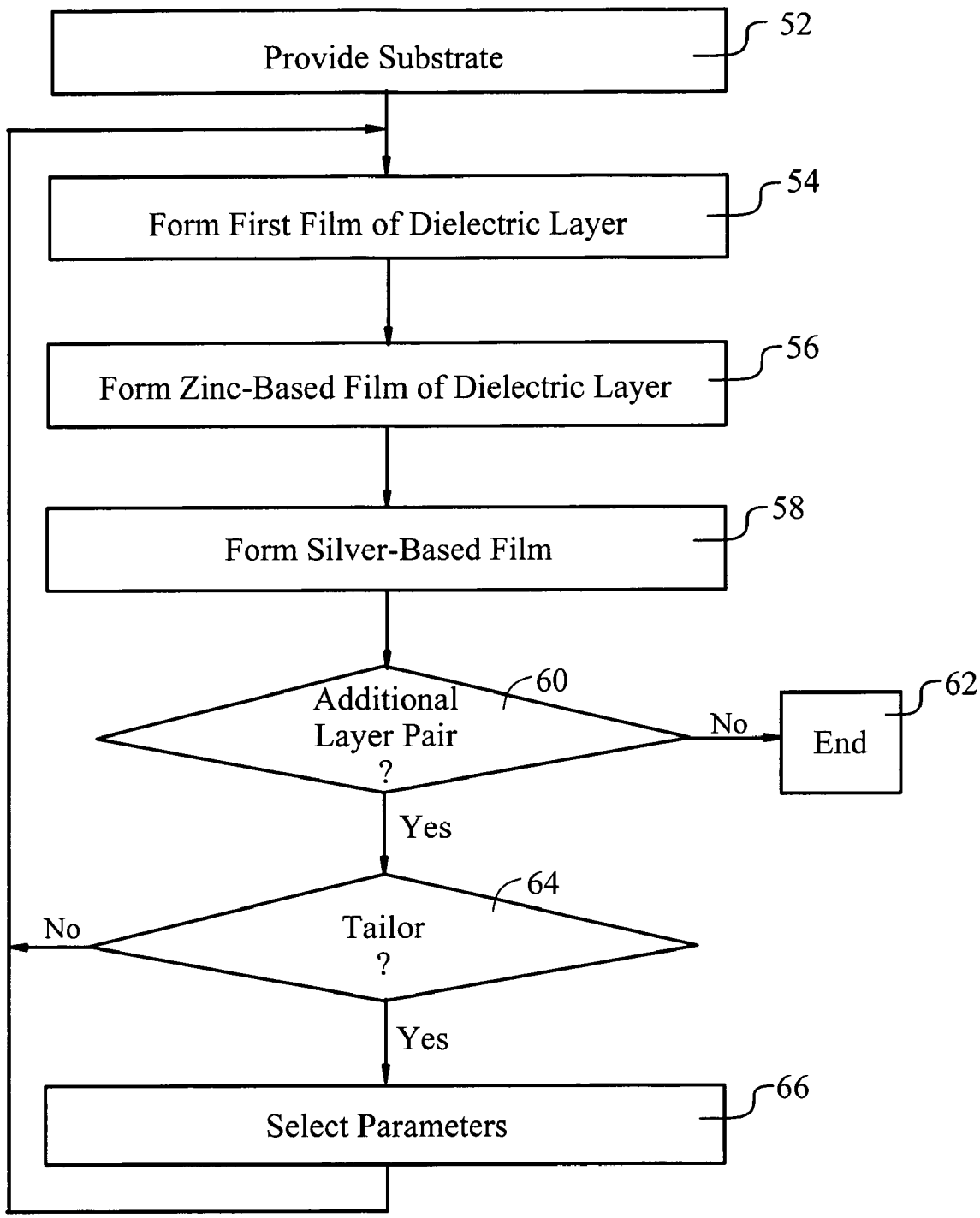
FIG. 3 is a sequence of steps for forming the optical filter of FIG. 1.

FIG. 3 illustrates a sequence of steps for forming the optical filter of FIGS. 1 and 2. Initially, a substrate is provided at step 52. The substrate may be a web of transparent flexible material, such as PET. Alternatively, the substrate may be a window, so that the various layers are formed directly on the window.

At step 54, the first film of the dielectric layer is formed. In the preferred embodiment, an indium oxide layer is formed using sputtering techniques. After the first film has been deposited, the zinc-based film is formed at step 56. This film has a thickness of at least 15 nm and combines with the first film to define the dielectric layer. The zinc-based film has a zinc content of at least 80 percent. In the preferred embodiment, the film is deposited using sputter targets which combine to comprise approximately 90 percent zinc and 10 percent tin. Alternatively, zinc aluminum may be formed and then oxidized.

The zinc-based film provides a seed layer for the silver-based film that is formed in step 58. This silver-based film comprises the metallic layer in establishing a Fabry-Perot filter. The film is at least 50 percent silver and is preferably at least 85 percent silver. Corrosion resistance is enhanced if gold is incorporated into the metallic layer.

In decision step 60, it is determined whether an additional pair of dielectric and metallic layers needs to be included. The optical filter in accordance with the invention includes at least two layer pairs, so that the response is an affirmative one. Thus, the process continues to step 64, wherein it is determined whether tailoring of the films should be provided for the second layer pair. That is, it is decided whether the three films within the second layer pair should be the same or different than the first pair. As previously described, the zinc-based film of the first layer pair may be thinner than the comparable film for subsequent layer pairs. Also described was the possible tailoring of the gold content within the silver-based film. With the determinations at step 60 and step 64, the sequence of three films is repeated at steps 54, 56 and 58.

Upon completion of the second executions of film formations at steps 54, 56 and 58, decision step 60 is encountered for a second time. If two pairs of dielectric and metallic layers are sufficient, the process ends at step 62. However, the preferred embodiment is one that includes three layer pairs, so that decision step 64 and selection step 66 again are reached and three additional films are formed. After the formation of the third layer pair, the process may end at step 62. However, for the optional inclusion of the films 36 and 38 of FIG. 1, the selection of parameters at step 66 includes the deletion of the silver-based layer upon return to step 54.

While not shown in the process flow of steps of FIG. 3, the optical filter may then be attached to a window, although it is often common to include other components, such as the hardcoat 50 of FIG. 2.

What is claimed is:

1. A method of providing an optical filter comprising:
   forming a layer stack on a substrate to include pairs of dielectric and metallic layers, including defining each said pair by:
   forming an indium-based transparent dielectric film as a first film of said dielectric layer, said transparent dielectric film having a refractive index of at least 1.1;
   forming a zinc-based film as a second film of said dielectric layer, said zinc-based film having a zinc content of at least 80 percent and having a thickness of at least 15 nm, said zinc-based film being in contact with the indium-based transparent dielectric film; and
   forming a silver-based film as said metallic layer, said silver-based film being in contact with said zinc-based film.

2. The method of claim 1 wherein forming said layer stack to include said pairs include forming said zinc-based film of the pair adjacent to said substrate to be thinner than said zinc-based film of each said pair further from said substrate.

3. The method of claim 1 wherein forming said silver-based film includes depositing an alloy of silver and gold in which said gold is included to control corrosion of said layer stack.

4. The method of claim 1 further comprising selecting said thickness of said zinc-based film and selecting the percentage of said zinc content on a basis of promoting formation of said silver-based film.

5. The method of claim 1 wherein forming said indium-based transparent dielectric films of said pairs of dielectric and metallic layers includes using sputtering techniques to deposit the indium-based transparent dielectric films.

6. The method of claim 1 wherein forming said zinc-based provides a film thickness in the range of 15 nm to 40 nm.

7. The method of claim 1 further comprising attaching said layer stack to a window.

8. A method of providing an optical filter comprising:
   forming a layer stack on a substrate to include pairs of dielectric and metallic layers, including defining each said pair by:
   forming a transparent dielectric film as a first film of said dielectric layer, said transparent dielectric film having a refractive index of at least 1.1;
   forming a zinc-based film as a second film of said dielectric layer, said zinc-based film having a zinc content of at least 80 percent and having a thickness of at least 15 nm; and
   forming a silver-based film as said metallic layer, said silver-based film being in contact with said zinc-based film;
   wherein forming said silver-based film includes depositing an alloy of silver and gold in which said gold is included to control corrosion of said layer stack;
   wherein depositing said alloy includes intentionally incorporating different percentages of gold among said silver-based films on a basis of distance from said substrate.

9. The method of claim 8 wherein said silver-based film furthest from said substrate is formed to have a higher percentage of gold than said silver-based film nearest to said substrate.

10. A filtering arrangement comprising:
    a transparent substrate; and
    a layer stack on said substrate, said layer stack including pairs of dielectric and metallic layers, each said pair being defined by:
    an indium-based transparent dielectric film as a first film of said dielectric layer, said transparent dielectric layer having a refractive index of at least 1.1;
    a zinc-based film as a second film of said dielectric layer, said zinc-based film having a zinc content of at least 80 percent and having a thickness in the range of 15 nm to 40 nm, said zinc-based film being in contact with said indium-based transparent dielectric film; and
    a silver gold film as said metallic layer, said silver gold film being in contact with said zinc-based film.

11. The filtering arrangement of claim 10 wherein said zinc-based film in the pair of dielectric and metallic layers adjacent to said substrate is thinner than said zinc-based film of each of the other said pairs.

12. The filtering arrangement of claim 11 wherein each said zinc-based film is zinc tin or zinc aluminum and said zinc content is approximately 90 percent.

13. The filtering arrangement of claim 10 wherein each said indium-based transparent dielectric layer is indium oxide.

14. The filtering arrangement of claim 10 wherein said substrate is attached to a window.

15. The filtering arrangement of claim 10 including three said pairs of dielectric and metallic layers.

16. The filtering arrangement of claim 10 wherein each said transparent dielectric film is $In_2O_3$.

17. A filtering arrangement comprising:

a transparent substrate; and a layer stack on said substrate, said layer stack including pairs of dielectric and metallic layers, each said pair being defined by:

a transparent dielectric film as a first film of said dielectric layer, said transparent dielectric layer having a refractive index of at least 1.1;

a zinc-based film as a second film of said dielectric layer, said zinc-based film having a zinc content of at least 80 percent and having a thickness in the range of 15 nm to 40 nm; and a silver gold film as said metallic layer, said silver gold film being in contact with said zinc-based film;

wherein said silver gold film in said pair of dielectric and metallic layers that is furthest from said substrate has a higher gold content than said silver gold film of each of the other said pairs.

* * * * *